(12) United States Patent
Martin et al.

(10) Patent No.: US 7,459,634 B2
(45) Date of Patent: Dec. 2, 2008

(54) SYSTEM AND METHOD FOR MANAGING CABLES

(75) Inventors: Randall W. Martin, The Woodlands, TX (US); Paul L. Drew, The Woodlands, TX (US); Nick Woodley, London (GB); David Quijano, Magnolia, TX (US); Stephen de Saulles, London (GB); Morten Warren, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 11/252,471

(22) Filed: Oct. 17, 2005

(65) Prior Publication Data

US 2007/0084621 A1    Apr. 19, 2007

(51) Int. Cl.
*H02G 3/04* (2006.01)

(52) U.S. Cl. ............... 174/97; 174/481; 174/135; 174/500; 361/681; 248/920

(58) Field of Classification Search .......... 174/481, 174/500, 505, 68.1, 68.2, 68.3, 95, 96–101, 174/135, 658, 660, 65 R; 242/400.1, 402, 242/404.1; 248/68.1, 69, 74.4, 919, 920, 248/922; 361/681, 682, 683
See application file for complete search history.

(56) References Cited

U.S. PATENT DOCUMENTS

| | | | |
|---|---|---|---|
| 3,491,971 A * | 1/1970 | Fisher | 248/65 |
| 3,516,631 A * | 6/1970 | Santucci | 248/71 |
| 4,681,378 A | 7/1987 | Hellman, III | |
| 4,736,826 A | 4/1988 | White et al. | |
| 4,866,215 A | 9/1989 | Muller et al. | |
| 5,018,052 A | 5/1991 | Ammon et al. | |
| 5,021,968 A | 6/1991 | Ferketic | |
| 5,272,988 A | 12/1993 | Kelley et al. | |
| 5,286,919 A | 2/1994 | Benson et al. | |
| 5,373,300 A * | 12/1994 | Jenness et al. | 343/702 |
| 5,432,505 A | 7/1995 | Wise | |
| 5,473,994 A | 12/1995 | Foley et al. | |
| 5,515,037 A | 5/1996 | Wise | |
| 5,523,747 A | 6/1996 | Wise | |
| 5,541,586 A | 7/1996 | Wise | |
| 5,615,682 A | 4/1997 | Stratz, Sr. | |
| 5,640,482 A | 6/1997 | Barry et al. | |
| 5,769,374 A | 6/1998 | Martin et al. | |
| 5,804,765 A | 9/1998 | Siemon et al. | |
| 5,831,211 A | 11/1998 | Gartung et al. | |
| 5,833,332 A | 11/1998 | Marshall et al. | |
| 5,893,539 A | 4/1999 | Tran et al. | |
| 5,921,402 A | 7/1999 | Magenheimer | |
| 5,957,556 A | 9/1999 | Singer et al. | |

(Continued)

OTHER PUBLICATIONS

Ergotron, Flat Panel Mounting Solutions, Desk Stand 100- Range of Motion, Copyright 2005 (search completed Sep. 30, 2005) (2 pgs.) (http://www.ergotron.com/3_products/flat_panel/deskstands/range.asp).

*Primary Examiner*—Dhiru R Patel (57) ABSTRACT

Embodiments of the present technique relate to a system for cable management. In one embodiment, the system includes a display, wherein the display includes a display screen, a cable passage having a route along a portion of the display, and a pliable flap extending at least partially across the cable passage along the route.

39 Claims, 9 Drawing Sheets

U.S. PATENT DOCUMENTS

| | | | |
|---|---|---|---|
| 6,016,252 | A | 1/2000 | Pignolet et al. |
| 6,050,849 | A | 4/2000 | Chang |
| 6,202,567 | B1 | 3/2001 | Funk et al. |
| 6,268,997 | B1 * | 7/2001 | Hong ..................... 361/681 |
| 6,284,978 | B1 | 9/2001 | Pavillard et al. |
| 6,303,864 | B1 | 10/2001 | Johnson et al. |
| 6,305,556 | B1 | 10/2001 | Mayer |
| 6,317,316 | B1 * | 11/2001 | Bentley et al. ............. 361/681 |
| 6,326,547 | B1 | 12/2001 | Saxby et al. |
| 6,327,139 | B1 | 12/2001 | Champion et al. |
| 6,330,168 | B1 | 12/2001 | Pedoeem et al. |
| 6,363,198 | B1 | 3/2002 | Braga et al. |
| 6,407,933 | B1 | 6/2002 | Bolognia et al. |
| 6,409,134 | B1 | 6/2002 | Oddsen, Jr. |
| 6,427,936 | B1 | 8/2002 | Noel et al. |
| 6,435,106 | B2 | 8/2002 | Funk et al. |
| 6,435,354 | B1 | 8/2002 | Gray et al. |
| 6,483,709 | B1 | 11/2002 | Layton |
| 6,525,273 | B1 | 2/2003 | Cunningham |
| 6,533,723 | B1 | 3/2003 | Lockery et al. |
| 6,546,181 | B1 | 4/2003 | Adapathya et al. |
| 6,554,218 | B2 | 4/2003 | Buyce et al. |
| 6,567,277 | B1 * | 5/2003 | Doherty et al. ............ 361/826 |
| D477,325 | S | 7/2003 | Theis et al. |
| 6,600,665 | B2 | 7/2003 | Lauchner |
| 6,609,691 | B2 | 8/2003 | Oddsen, Jr. |
| 6,619,606 | B2 | 9/2003 | Oddsen, Jr. et al. |
| 6,637,104 | B1 | 10/2003 | Masuda et al. |
| 6,646,893 | B1 | 11/2003 | Hardt et al. |
| 6,705,890 | B2 * | 3/2004 | Kitou et al. ................. 439/528 |
| 6,713,678 | B2 * | 3/2004 | Masuda et al. ............ 174/72 A |
| 6,719,253 | B2 | 4/2004 | Oddsen, Jr. |
| 6,721,414 | B1 | 4/2004 | Rojas et al. |
| 6,724,970 | B2 | 4/2004 | Adapathya et al. |
| 6,726,167 | B2 | 4/2004 | Oddsen, Jr. |
| 6,742,746 | B1 * | 6/2004 | La Scola et al. ............ 248/49 |
| 6,805,248 | B2 | 10/2004 | Champion et al. |
| 6,811,039 | B2 | 11/2004 | Chen et al. |
| 6,816,364 | B2 * | 11/2004 | Helot et al. ................. 361/681 |
| 6,856,505 | B1 | 2/2005 | Venegas et al. |
| 6,879,293 | B2 * | 4/2005 | Sato ........................... 343/702 |
| 6,902,069 | B2 | 6/2005 | Hartman et al. |
| 6,915,994 | B2 | 7/2005 | Oddsen, Jr. |
| 7,057,889 | B2 * | 6/2006 | Mata et al. .................. 361/683 |
| 2001/0013305 | A1 | 8/2001 | Funk et al. |
| 2001/0023914 | A1 | 9/2001 | Oddsen, Jr. |
| 2001/0024904 | A1 | 9/2001 | Fischer |
| 2002/0066843 | A1 | 6/2002 | Oddsen, Jr. et al. |
| 2002/0073516 | A1 | 6/2002 | Behar |
| 2002/0074460 | A1 | 6/2002 | Behar |
| 2003/0010862 | A1 | 1/2003 | Buyce et al. |
| 2003/0026084 | A1 | 2/2003 | Lauchner |
| 2003/0037953 | A1 | 2/2003 | Sarkinen et al. |
| 2003/0066936 | A1 | 4/2003 | Beck et al. |
| 2003/0075646 | A1 | 4/2003 | Womack et al. |
| 2003/0075655 | A1 | 4/2003 | Oddsen, Jr. |
| 2003/0080268 | A1 | 5/2003 | Oddsen, Jr. |
| 2003/0123832 | A1 | 7/2003 | Adapathya et al. |
| 2003/0168238 | A1 | 9/2003 | Masuda et al. |
| 2003/0222034 | A1 | 12/2003 | Champion et al. |
| 2003/0234328 | A1 | 12/2003 | Oddisen, Jr. |
| 2004/0065787 | A1 | 4/2004 | Hardt et al. |
| 2004/0079711 | A1 | 4/2004 | Hartman et al. |
| 2004/0108289 | A1 | 6/2004 | Chen et al. |
| 2004/0114313 | A1 | 6/2004 | Mata et al. |
| 2004/0149533 | A1 | 8/2004 | Milano |
| 2004/0182798 | A1 | 9/2004 | Williams |
| 2004/0222344 | A1 | 11/2004 | Oddsen, Jr. |
| 2005/0057912 | A1 | 3/2005 | Hardt et al. |
| 2005/0067358 | A1 | 3/2005 | Lee et al. |
| 2005/0076479 | A1 | 4/2005 | Rolla et al. |
| 2005/0135767 | A1 | 6/2005 | Diaz et al. |

* cited by examiner

SYSTEM AND METHOD FOR MANAGING CABLES

BACKGROUND

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Home entertainment systems, personal computers, and the like generally include displays that receive power and communicate with other devices via cables. These displays are often implemented with other components, and peripheral devices that generally occupy the same workspace or area. For example, a flat panel computer display is often utilized along with optional accessories such as speakers and cameras that are mounted to the flat panel display. The peripheral devices, other components, and the display itself often utilize various combinations of cables (e.g., signal cables and power cables) to operate and communicate with one another.

Unfortunately, it can be cumbersome to have a number of cables from various devices and peripherals in the same area. Indeed, the various cables can become tangled and disorganized, resulting in an unaesthetic appearance and logistical issues relating to connecting and disconnecting the cables. For example, devices can become dislodged or disconnected due to cables being snagged or pulled inadvertently.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation-specific decisions will be made to achieve the developers' specific goals, such as compliance with system-related and business-related constraints, which can vary from one implementation to another. Moreover, it should be appreciated that such a development effort can be complex and time consuming, but would remain a routine undertaking of design, fabrication, and manufacture for those of ordinary skill having the benefit of this disclosure. It should be noted that illustrated embodiments of the present technique throughout this text represent a general case.

Figure 1:
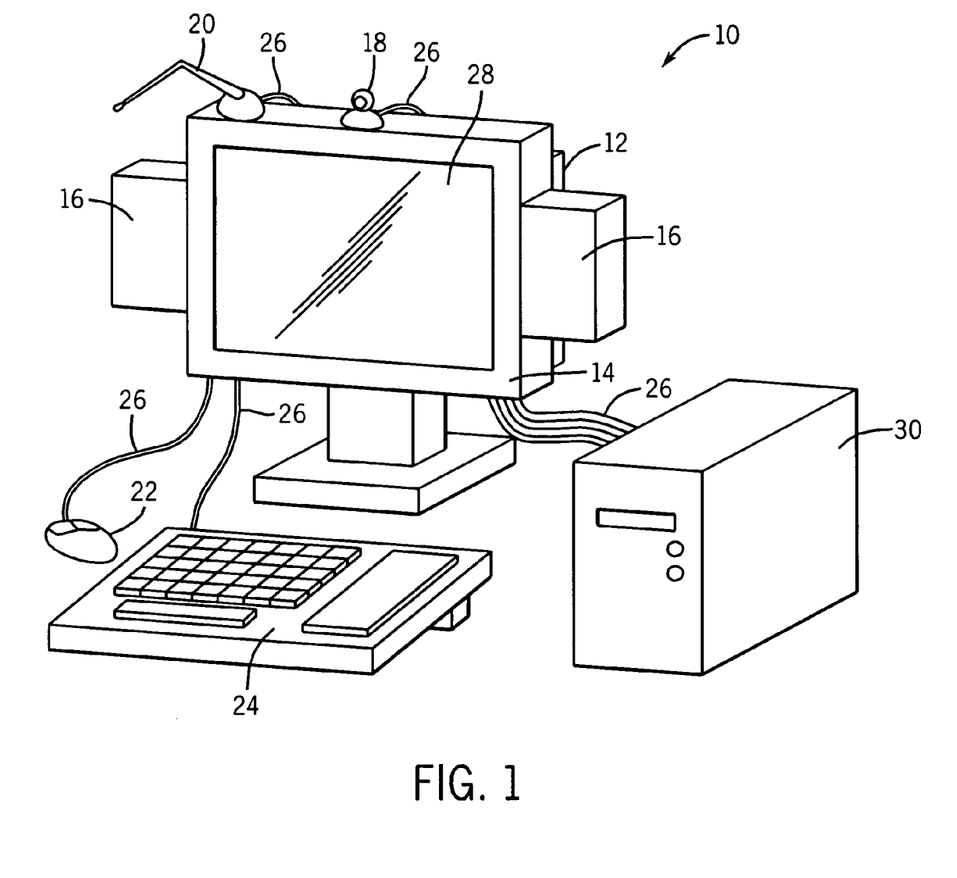
FIG. 1 is a perspective view of a computer system with various peripheral components disposed about a display and having cables that pass through a cable routing system on the display in accordance with embodiments of the present technique.

Embodiments of the present technique generally relate to efficiently and aesthetically managing cables in a limited workspace. Specifically, embodiments of the present technique relate to a cable routing system for a display (e.g., monitor, video screen, all-in-one computer, panel computer, and liquid crystal display or television, plasma television, or conventional television). Such a routing system facilitates flexible organization, retention, and concealment of cables for peripheral components disposed about a display and/or cables extending from the display itself. The flexible material can accommodate a variety of sizes and quantities of cables due to the flexible nature of the material. In addition, the flexible material enables removable retention of the cables without using tools or threaded fasteners. Accordingly, a user can mount the cables by simply sliding or pushing the cables under the flexible material. As discussed in detail below, the disclosed routing system includes a length of flexible or pliable material (e.g., a pliable flap) disposed over the cables along a cable passage or route, such that the cables can be easily retained or removed from the display along an edge or through an opening in the pliable material. FIG. 1 is a perspective view of a computer system 10 having a cable routing system 12 on a display 14 in accordance with present embodiments. Specifically, FIG. 1 depicts the computer system 10 with various peripheral components 16, 18, 20, 22, 24 disposed about the display 14 and having cables 26 that pass through the cable routing system 12 on the display 14. It should be noted that in some embodiments, the cables 26 include power and/or a communication cables that extend from the display 14 itself.

The peripheral components illustrated in FIG. 1 include speakers 16, a camera 18, a microphone 20, a mouse 22, and a keyboard 24. These are exemplary peripheral components, and it should be noted that different peripheral components can be incorporated in other embodiments. Also, while in the illustrated embodiment the display 14 is a flat panel computer monitor, in other embodiments, the display 14 can include a television, a cathode ray tube (CRT), a laptop display, an all-in-one computer, a panel computer, and so forth. For example, the all-in-one computer generally includes the display 14 and computer (e.g., processor, motherboard, memory, disc drive, video card, and audio card) all in a single enclosure. By further example, the panel computer includes a flat-panel display 14 and computer disposed in a single panel-shaped housing. Further, while in the illustrated embodiment, the cable routing system 12 is disposed on a back portion of the display 14 (opposite a screen 28 of the display 14), in alternative embodiments, the cable routing system 12 is disposed on a front portion and/or peripheral portions of the display 14.

The cable routing system 12 flexibly organizes, retains, and conceals all or a portion of the cables 26 from view as they are routed along the computer display 14 for connection to a computer 30, to other peripheral components, and/or to the display 14 itself In the illustrated embodiment, the cables 26 from the peripheral components 16, 18, 20, 22, 24 couple to the display 14 via the cable routing system 12 and are accumulated near the base of the display 14. This facilitates connection of the massed cables 26 to the computer 30. It should be noted that in some embodiments, the cables 26 are massed at an exit portal in the cable routing system 12, thus organizing the cables 26 into a group, facilitating efficient use of space, and improving aesthetic appeal. Further, in some embodiments, a connector block is included that communicatively couples to one or multiple of the peripheral components (e.g., 16, 18, 20, 22, 24). Such connector blocks can provide a single point of access via an umbilical cable (e.g., a cable adapted to transmit power and/or communication signals to and from a number of devices). Additionally, it should be noted that the connector block can be integral or separate from the cable routing system 12.

Figure 2:
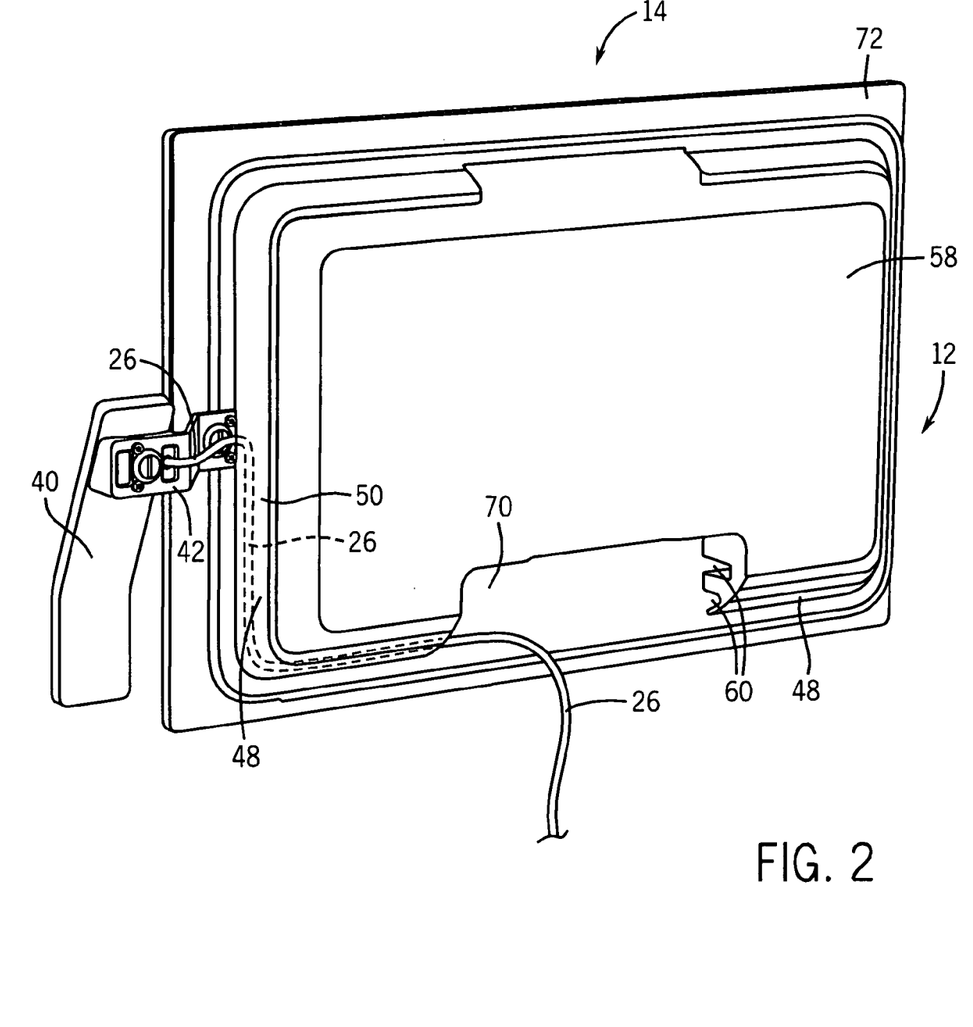
FIG. 2 is a perspective view of the rear of the display illustrating the cable routing system coupled to a peripheral device via a bracket in accordance with embodiments of the present technique.
Figure 3:
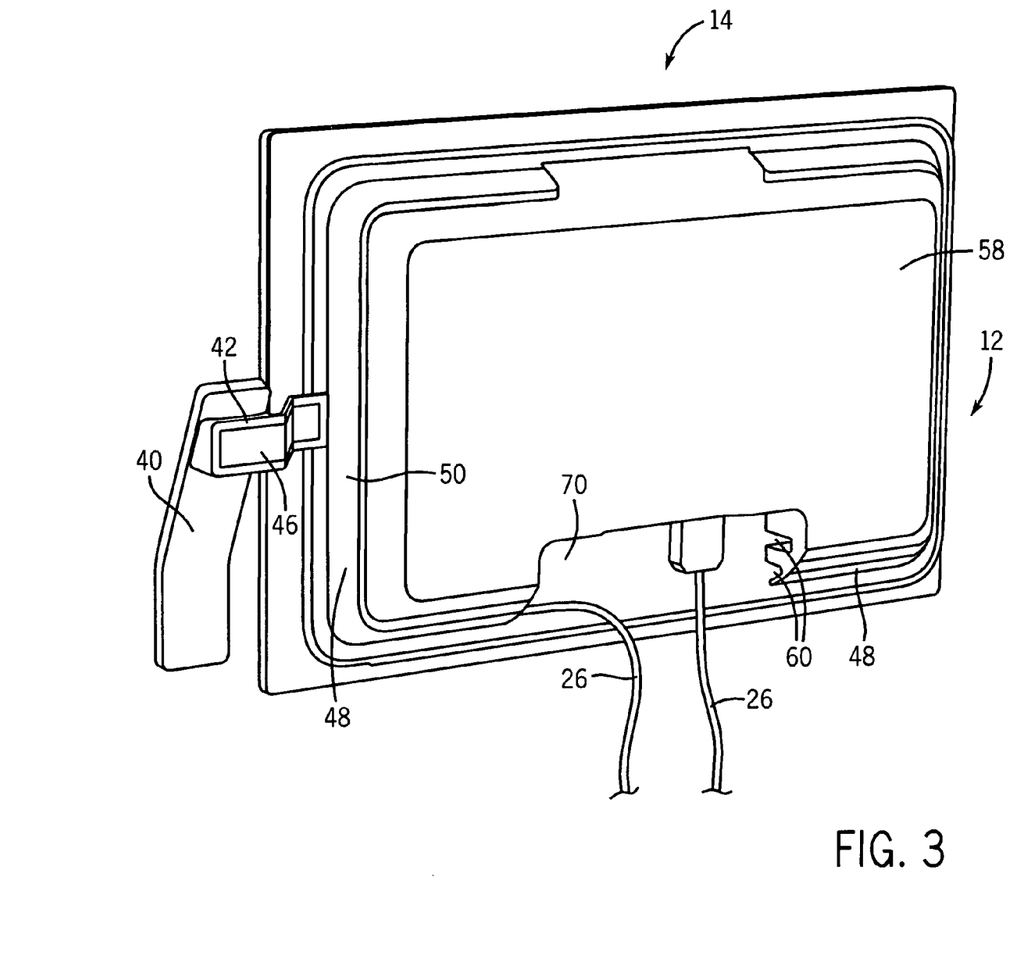
FIG. 3 is a perspective view of the rear of the display and the cable routing system coupled to a peripheral device via the bracket, wherein the bracket is coupled to a bracket cover in accordance with embodiments of the present technique.

FIG. 2 is a perspective view of the display 14 and the cable routing system 12 as illustrated from the rear of the display 14. Specifically, FIG. 2 illustrates a peripheral component 40 having its corresponding cable 26 engaged with the cable routing system 12. For example, the peripheral component 40 may be a speaker, a camera, a phone, a microphone, a printer, a scanner, a light, or a combination thereof The peripheral component 40 is coupled to the display 14 via a bracket 42 extending from the display 14. The bracket 42 can be removably coupled to the display 14 or integral to the display 14. In the illustrated embodiment, in addition to coupling the peripheral component 40 to the display 14, the bracket 42 routes the cable 26 from the peripheral component 40 over to the routing system 12 and provides concealment of the cable 26. In some embodiments, the bracket 42 further conceals the cable 26 and provides additional support by including a bracket cover 46, as illustrated in FIG. 3. It should be noted that in some embodiments, the peripheral component 40 is directly coupled to the display 14 without using a bracket. For example, in one embodiment, the peripheral component 40 (e.g., a camera) is placed atop the display 14. Additionally, the bracket 42 can be coupled to or integral with the cable routing system 12.

Figure 4:
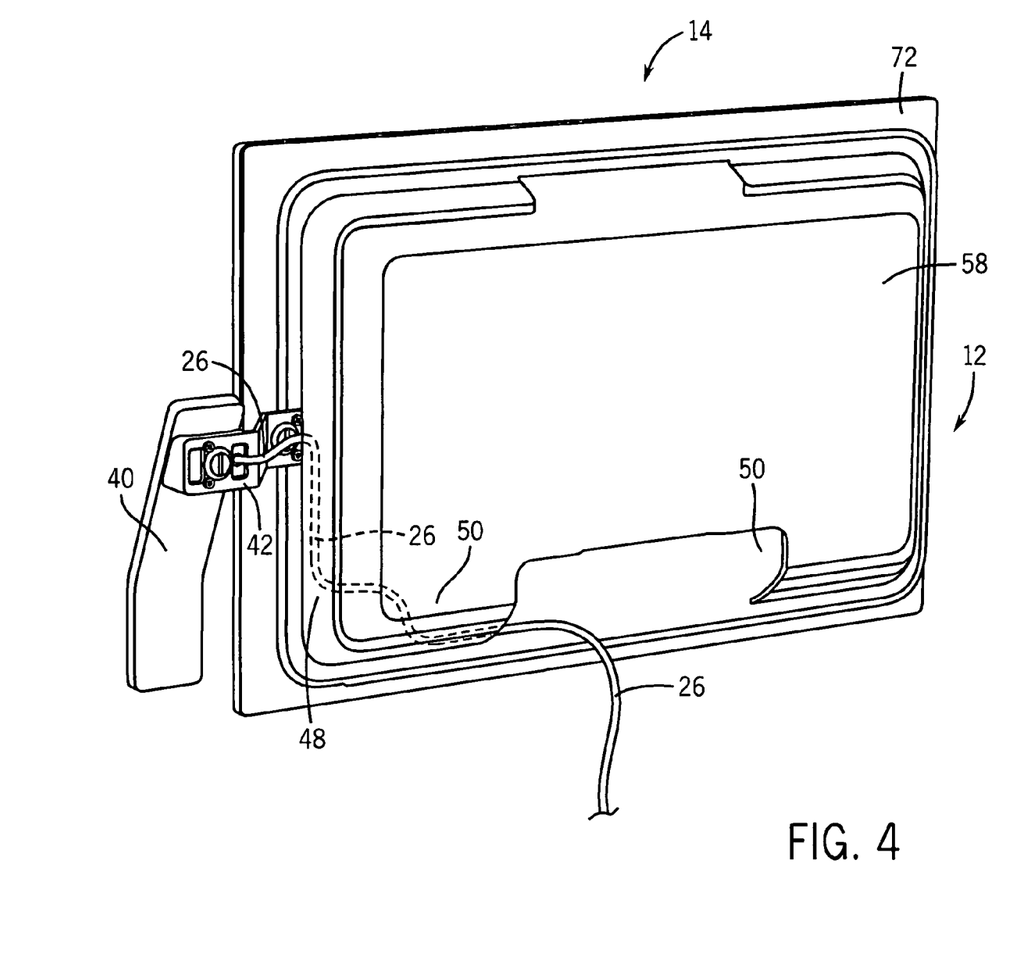
FIG. 4 is a perspective view of the rear of the display and the cable routing system, wherein a flexible lip of the cable routing system comprises a flap that covers a majority of the back surface of the display in accordance with embodiments of the present technique.
Figure 5:
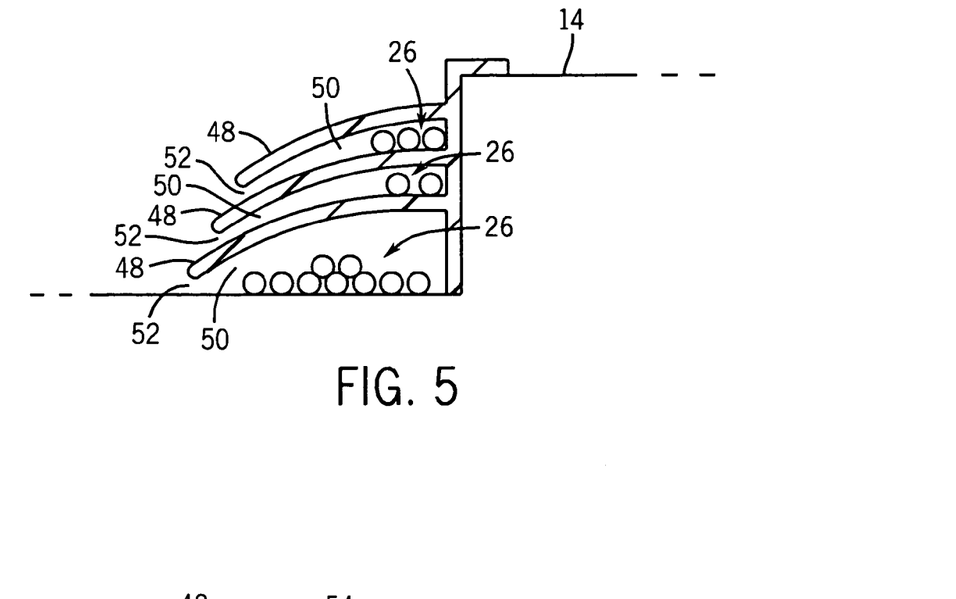
FIG. 5 is a cross-sectional view of multiple flexible lips of the cable routing system, the multiple flexible lips being stacked atop one another to provide layers of cable passages in accordance with embodiments of the present technique.

In the illustrated embodiment, the cable 26 is routed underneath a strip of flexible material, a pliable flap, or flexible lip 48 of the cable routing system 12. The flexible lip 48 extends outward from a central portion of the cable routing system 12 and forms a cable passage 50 along the periphery of the back of display 14. In some embodiments, the cable passage 50 is formed along different portions (e.g., along the middle of the back or along the sides) of the display 14. For example, in one embodiment, the flexible lip 48 forms a large cavity over a central portion of the display 14, thus providing storage and concealment for a large number of cables 26. Indeed, the flexible lip 48 can include a flap that covers a majority of the back surface of the display 14 and that creates a large cable passage 50, as illustrated in FIG. 4. Further, in some embodiments, multiple flexible lips 48 are employed. For example, FIG. 5 illustrates multiple flexible lips 48 stacked atop one another to provide layers of cable passages 50. Having multiple layers of cable passages 50 enables a user to organize cables 26 according to layer. Moreover, the extra layers provide routing and concealment for additional cables 26.

Figure 6:
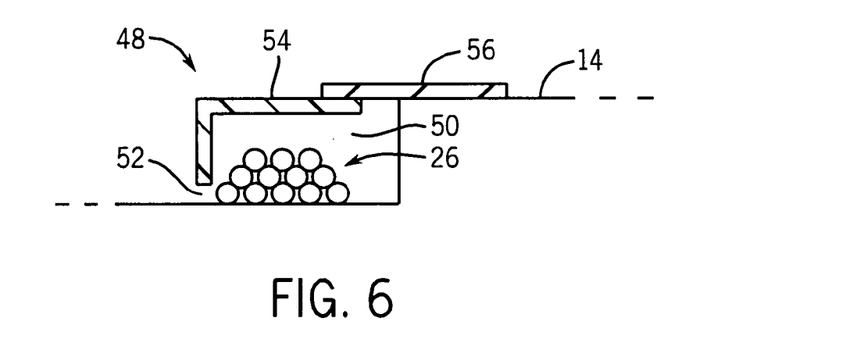
FIG. 6 is a cross-sectional view of the flexible lip adjacent the display, the flexible lip having a rigid portion and a flexible portion that operates as a biased hinge in accordance with embodiments of the present technique.

As illustrated in FIGS. 2-4, the flexible lip 48 extends lengthwise along the cable passage 50, and extends at least partially over the cable passage 50 except for a slit, groove, or general opening 52 to enable insertion and removal of the cables 26. In one embodiment, the flexible lip 48 includes a single piece or strip of flexible material (e.g., rubber) secured to the display 14 via an adhesive, screws, latches, or other fasteners. In another embodiment, as illustrated by FIG. 6, the flexible lip 48 includes a rigid portion 54 and a flexible portion 56 that operates as a biased hinge. The rigid portion 54 lifts up to receive the cables 26 and then the flexible portion 56 causes it to flex back into place, thus retaining the cables 26 in position. Further, the flexible lip 48 can be integral to a frame 58 of the cable routing system 12 or removably coupled to the frame 58. The flexible lip 48 is biased against the display 14 such that when the cable 26 is routed underneath the flexible lip 48, the cable 26 is retained (e.g., pressed against the display 14) and at least partially concealed by the flexible lip 48. In one embodiment, the flexible lip 48 is adapted to retain the cable in a chamber separate from the flexible lip 48.

Figure 7:
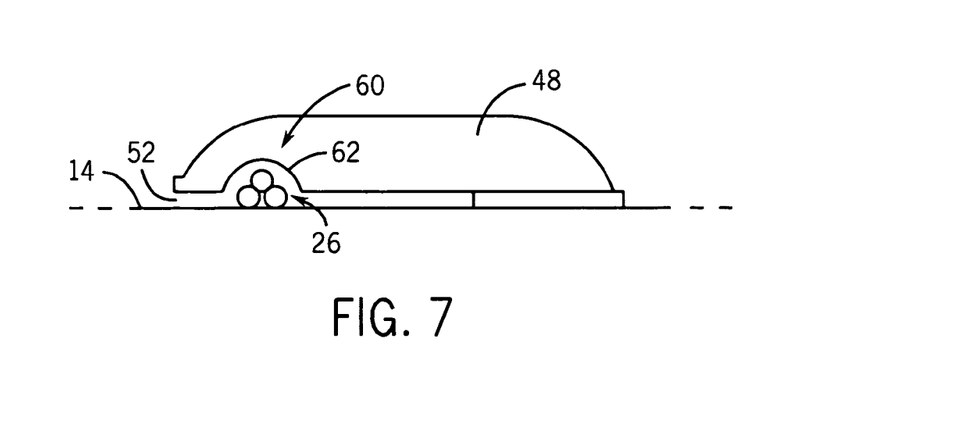
FIG. 7 is a cross-sectional view of the flexible lip adjacent the display, the flexible lip having a U-shaped recess that forms a cable channel for routing the cables in accordance with embodiments of the present technique.
Figure 8:
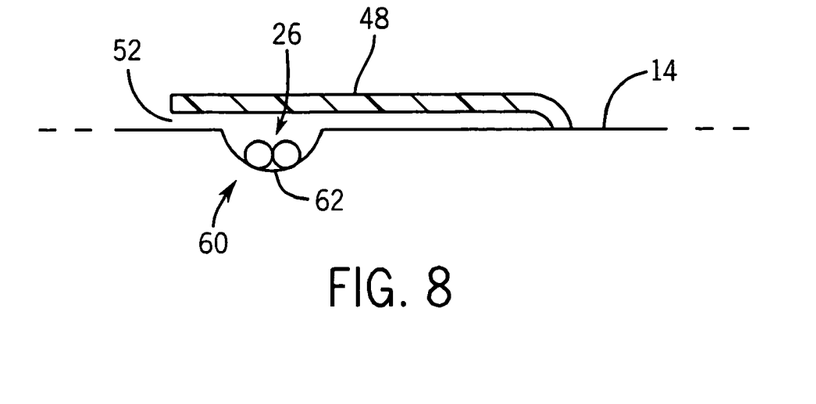
FIG. 8 is a cross-sectional view of the flexible lip adjacent the display, the display having a U-shaped recess that forms a cable channel for routing the cables in accordance with embodiments of the present technique.
Figure 9:
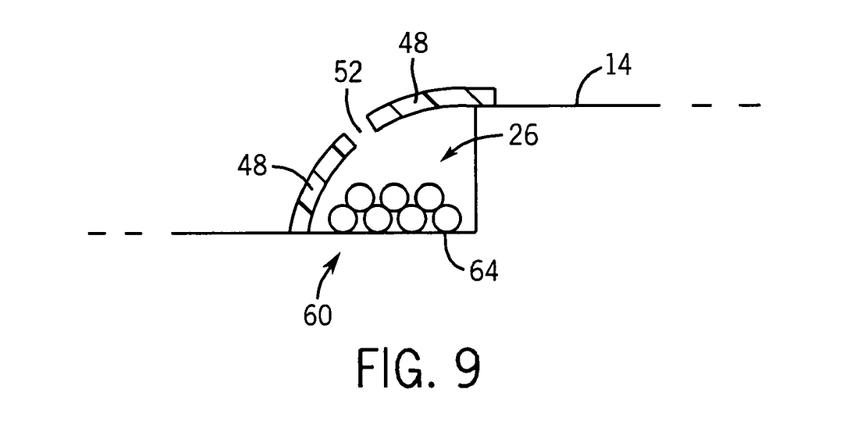
FIG. 9 is a cross-sectional view of the flexible lip adjacent the display, the display having an L-shaped recess that forms a cable channel for routing the cables and the flexible lip having a centralized access opening in accordance with embodiments of the present technique.
Figure 10:
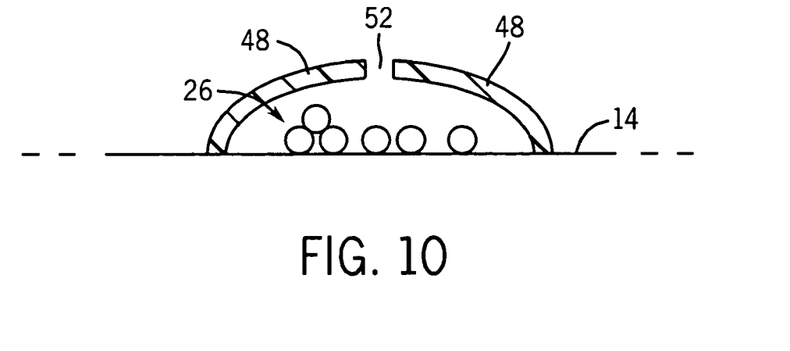
FIG. 10 is a cross-sectional view of the flexible lip adjacent the display, the flexible lip and display forming a cavity that operates as a cable passage in accordance with embodiments of the present technique.

In the embodiment illustrated by FIGS. 2 and 3, the flexible lip 48 includes a pair of cable channels 60 that receive and route the cables 26 along the cable passage 50 of the cable routing system 12. Cable channels 60 facilitate retention and concealment of the cables 26 and provide a guide for routing the cables 26. In some embodiments, a cable channel 60 is disposed in a panel (e.g., the back panel of the display 14 or a panel of the cable routing system 12) adjacent the flexible lip 48 or in both the flexible lip 48 and the panel. For example, in the embodiment illustrated by FIG. 7, the cable channel 60 is a U-shaped recess 62 in the flexible lip 48. In another embodiment, the cable channel 60 is a U-shaped recess 62 in a panel of the display 14 adjacent the flexible lip 48, as illustrated in FIG. 8. In yet another embodiment, the cable channel 60 is an L-shaped portion 64 of a panel of the display 12 adjacent the flexible lip 48, as illustrated by FIG. 9. Further, the cable channel 60 can include a cavity or passage between a surface (flat or recessed) of the display 14 or cable routing system 12 and the flexible lip 48, as illustrated in FIG. 10. It should be noted that FIGS. 9 and 10 also illustrate a central placement of the opening 52 in the flexible lip 48.

In the embodiment illustrated by FIGS. 2 and 3, the cable channel 60 routes the cable 26 along the perimeter of the cable routing system 12 to an exit portal 70 near the base of the display 14. The exit portal 70 facilitates connection of the various peripheral devices 16, 18, 20, 22, and the display 14 to other equipment and arrangement of the cables 26 within the cable routing system 12. The cable routing system 12 is designed such that the cables 26 can enter the cable routing system 12 at a number of locations along the perimeter of the cable routing system 12 via the flexible lip 48. Once the cables 26 are gathered, the cables 26 can then collectively exit the cable routing system 12 at the exit portal 70 for connection to other components (e.g., computer 30).

Figure 11:
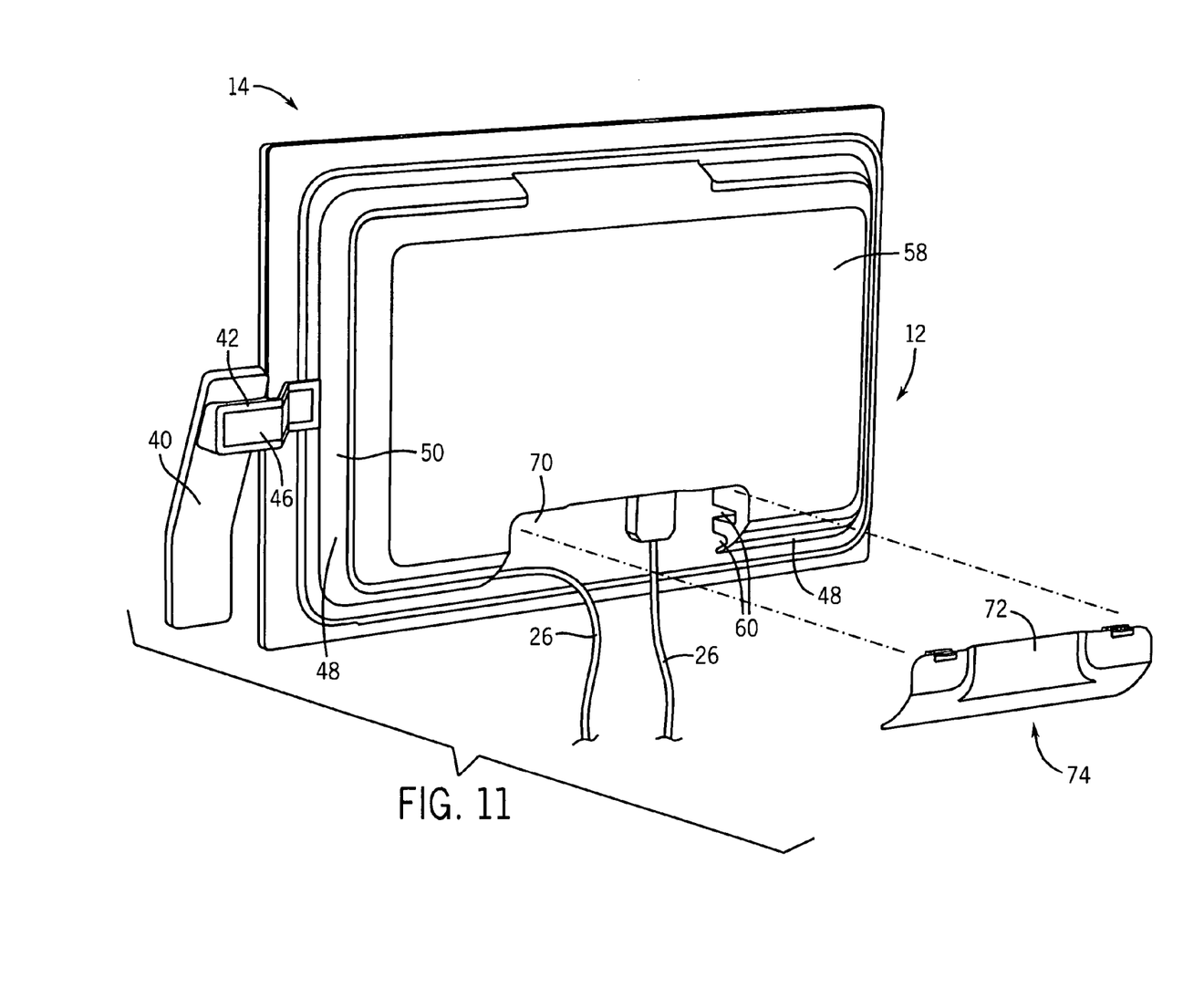
FIG. 11 is a perspective view of the rear of the display and the cable routing system, wherein an exit portal cover is being disposed over an exit portal in the cable routing system in accordance with embodiments of the present technique.

In some embodiments, to improve aesthetic appeal of the display 14 and to further organize and retain the cables 26, an exit portal cover 72 is provided, as illustrated in FIG. 11. Specifically, FIG. 11 depicts the exit portal cover 72 being disposed over the exit portal 70, to provide additional concealment, support, and securement for the cables 26. When this exit portal cover 72 is removed, ready access is provided to the cables 26 stored in the cable routing system 12. Having this accessibility facilitates insertion, extraction, and manipulation of the cables 26 in the cable routing system 12 via the exit portal 70. When the exit portal cover 72 is in place over and affixed proximate the exit portal 70, the cables 26 are contained and at least partially concealed from view. The exit portal cover 72 includes a slot 74 that provides a discreet (e.g., smaller) access point for the cables 26, thus improving aesthetic appeal, conserving workspace, and improving organization of the cables 26.

Figure 12:
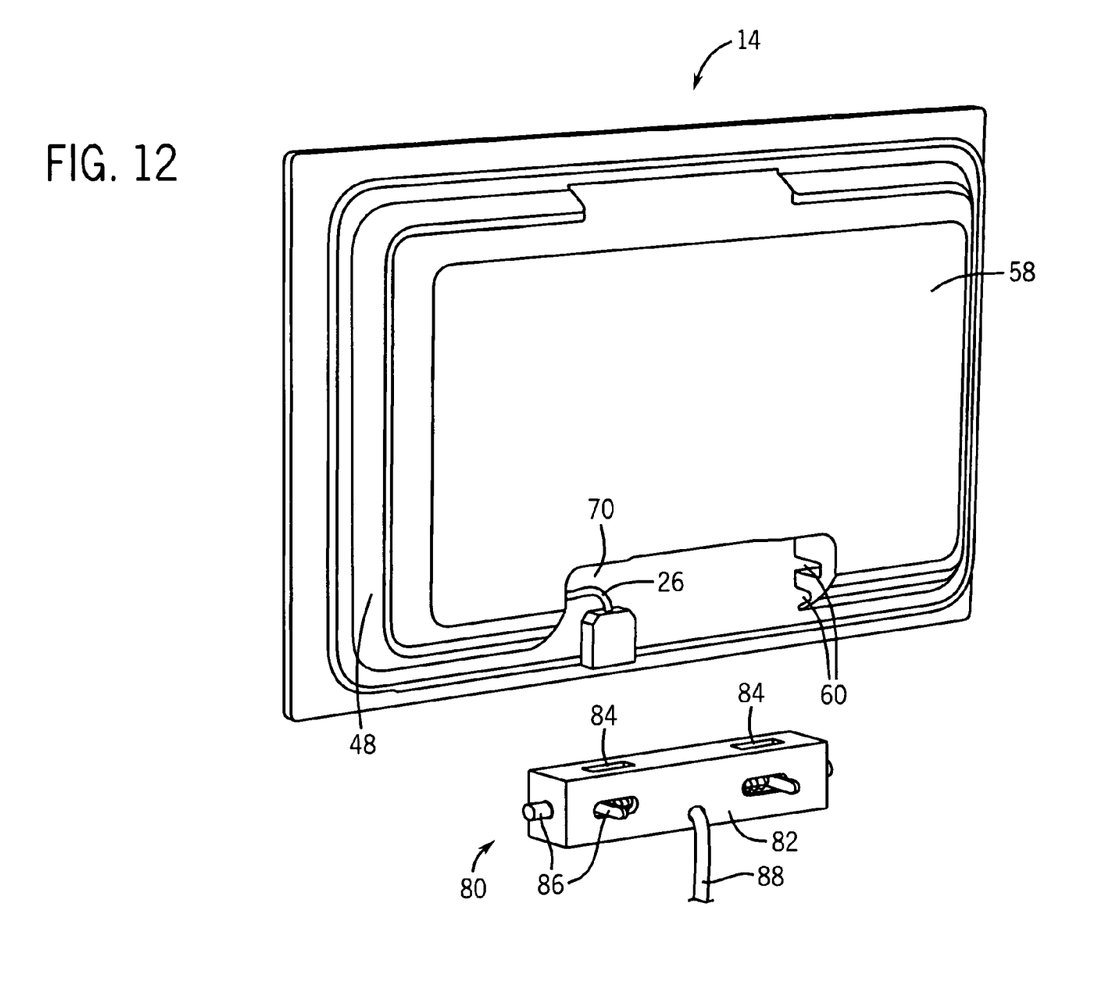
FIG. 12 is a perspective view of the rear of the display and the cable routing system, wherein a connector block is utilized to consolidate cables disposed within the cable routing system in accordance with embodiments of the present technique.

FIG. 12 is a perspective view of yet another embodiment of the present technique, wherein a connector block 80 is utilized to consolidate cables 26 and improve organization. Specifically, FIG. 12 depicts the display 14 having the cable routing system 12 attached on a rear panel of the display 14 and the connector block 80, which is adapted or configured to couple to the cable routing system 12 and the cables 26. The connector block 80 is adapted or configured to communicatively couple to one or multiple of the cables 26 disposed within the cable routing system 12.

The connector block 80 provides a single point of access to the multiple cables 26 and their corresponding components (e.g., peripheral devices 16, 18, 20, 22, 24 and display 14). In the illustrated embodiment, the connector block 80 includes a main body 82, a plurality of reception ports 84 for coupling to the various cables 26, a tool-free quick connect/release mechanism 86 for attaching and detaching from the cable routing system 12, and a single umbilical cable 88 that consolidates the attached cables 26. The umbilical cable 88 facilitates communicative connection to a device (e.g., computer 30 and/or a power source) and transmission of information and/or power between the device and the cables 26 via the reception ports 84. Additionally, the umbilical cable 88 acts as an extension cord, providing additional length for coupling the cables 26 to other components.

It should be noted that in some embodiments, the tool-free quick connect/release mechanism 86 of the connector block 80 is replaced or supplemented by other connection mechanisms. For example, in some embodiments, latches, screws, male and female components, and so forth can be utilized in place of or in support of the tool-free quick connect/release mechanism 86. Further, it should be noted that while in the illustrated embodiment, the connector block 80 is separate from the cable routing system 12, in other embodiments it is an integral part. In some embodiments, the connector block 80 is integral to the cable routing system 12.

Figure 13:
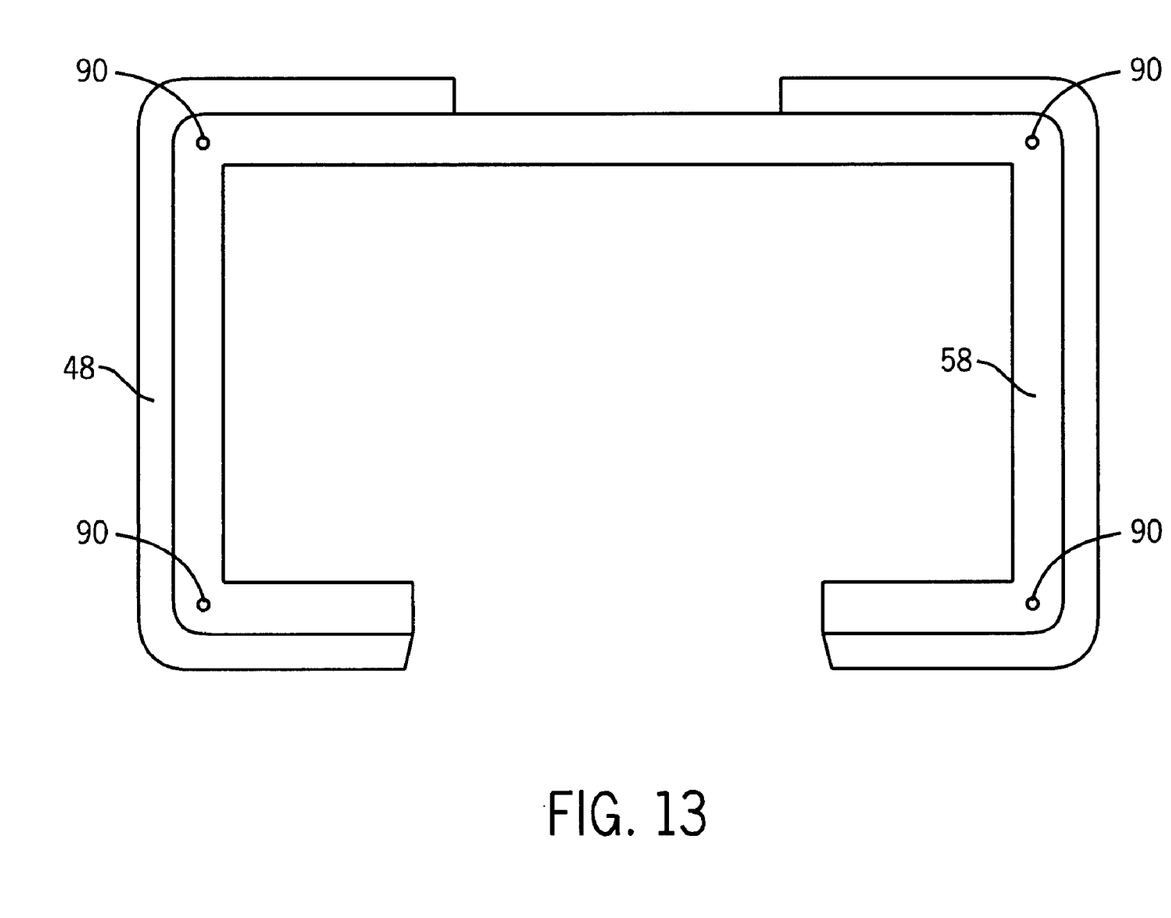
FIG. 13 is a perspective view of the cable routing system separate or disconnected from the display in accordance with embodiments of the present technique.

FIG. 13 is a perspective view of the cable routing system 12 separate or disconnected from the display 14, illustrating one embodiment of the present technique. The cable routing system 12 is adapted to attach to the display 14 and to detach therefrom. For example, in the illustrated embodiment, the cable routing system 12 includes attachment points 90 that can be used with screws to couple to the display 14. In other embodiments, latches, spring-loaded pins, male and female connectors, adhesives, tape and so forth can be utilized to couple the cable routing system 12 to the display 14. For example, in one embodiment the cable routing system 12 has a base panel with a tacky side that allows for removeable coupling to the display 14 by pressing the tacky side against the display 14.

Providing the cable routing system 12 separate from the display 14 facilitates transfer of the cable routing system 12 between multiple displays 14. Further, by facilitating detachment and reattachment of the cable routing system 12 with the display 14, a user can dispose cables 26 within the cable routing system 12 prior to connecting the cable routing system to the display 14. In some embodiments, this improves efficiency and ease of use.

While the present technique may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising: a display comprising:
   a display screen; a cable passage having a route along a portion of the display; and
   a pliable flap attached to the display and extending at least partially across the route of the cable passage and extending lengthwise along an entire length of the route of the cable passage.

2. The system of claim 1, wherein the cable passage is disposed in a back panel of the display opposite the display screen.

3. The system of claim 1, wherein the cable passage is disposed along a side panel of the display.

4. The system of claim 1, wherein the cable passage is disposed along a perimeter of the display screen.

5. The system of claim 1, wherein the pliable flap is removably coupled to the display.

6. The system of claim 1, wherein the pliable flap is an integral portion of the display.

7. The system of claim 1, wherein the pliable flap includes:
   a rigid cover portion extending at least partially across the cable passage; and
   a flexible portion that operates as a hinge between the rigid cover portion and the display.

8. The system of claim 7, wherein the rigid cover portion comprises plastic and the flexible portion comprises rubber.

9. The system of claim 1, wherein the cable passage comprises a cable channel recessed into the display, and the cable channel extends lengthwise along at least a substantial portion of the entire length of the route of the cable passage.

10. The system of claim 1, comprising an exit port in the cable passage and an exit port cover panel having an access slot, wherein the exit port cover is disposed over the exit port.

11. The system of claim 1, comprising a connector block coupleable to the display proximate an exit port in the cable passage.

12. The system of claim 11, wherein the connector block is coupled to one or multiple of a camera, a microphone, a speaker, a computer, a phone, a second display, or a combination thereof.

13. The system of claim 1, wherein the display comprises a personal computer and a flat panel display screen disposed integrally in a single panel-shaped housing.

14. The system of claim 1, wherein the pliable flap comprises a slit configured to facilitate insertion of a cable into the cable passage, and the slit extends lengthwise continuously along the entire length of the cable passage.

15. The system of claim 1, wherein the pliable flap comprises a single strip extending lengthwise continuously along the entire length of the cable passage.

16. The system of claim 1, wherein the cable passage is sized to hold a plurality of cables.

17. The system of claim 1, wherein the pliable flap comprises rubber.

18. A cable management apparatus, comprising: a structure adapted to couple to a display; and a pliable flap attached to the display and extending at least partially across a cable route on the structure and extending lengthwise along a substantial portion of the cable route on the structure.

19. The apparatus of claim 18, wherein the cable route comprises a channel recessed into the structure, and the channel extends lengthwise along at least a substantial portion of the entire length of the cable route.

20. The apparatus of claim 18, wherein the pliable flap and the cable route are disposed along a perimeter of the structure.

21. The apparatus of claim 18, wherein the pliable flap is removably coupled to the structure.

22. The apparatus of claim 18, wherein the pliable flap includes a rigid portion and a flexible portion.

23. The apparatus of claim 18, wherein the pliable flap comprises a slit configured to facilitate insertion of a cable between the pliable flap and the display, and the slit extends lengthwise continuously along an entire length of the slit.

24. The apparatus of claim 18, wherein the pliable flap comprises a single strip extending lengthwise continuously along an entire length of the cable route.

25. The system of claim 18, wherein the pliable flap is configured to cover a plurality of cables.

26. The apparatus of claim 18, wherein the pliable flap comprises rubber.

27. The system of claim 18, wherein the pliable flap includes:
    a rigid cover portion extending at least partially across the cable route; and
    a flexible portion that operates as a hinge between the rigid cover portion and the display.

28. A method of managing cables, comprising: routing a length of a cable along a cable passage between a pliable flap and a display, wherein the pliable flap extends lengthwise along a substantial length of the cable passage; and retaining the cable with the display via the pliable flap attached to the display.

29. The method of claim 28, comprising flexing the pliable flap on the display to receive a plurality of cables.

30. The method of claim 28, comprising facilitating access to the cable via an exit port, wherein the exit port is a portion of the cable passage uncovered by the pliable flap.

31. The method of claim 21, comprising receiving an exit port cover over the exit port.

32. The method of claim 28, comprising receiving a connector block for coupling multiple cables proximate the exit port.

33. The method of claim 28, comprising storing a plurality of cables between the pliable flap and the display.

34. The method of claim 28, wherein the pliable flap comprises rubber.

35. The method of claim 28, wherein the pliable flap comprises a single strip extending lengthwise continuously along an entire length of the cable route.

36. The method of claim 28, wherein the pliable flap includes:
    a rigid cover portion extending at least partially across the cable passage; and
    a flexible portion that operates as a hinge between the rigid cover portion and the display.

37. A system, comprising:
    a display comprising:
    a display screen; and a cable routing system coupled to the display comprising:
    a pliable flap attached to the display and configured to extend at least substantially over a plurality of cables to provide a covered cable passage that extends lengthwise continuously along the plurality of cables along a portion of the display such that the pliable flap is not limited to only a single point along the plurality of cables.

38. The system of claim 37, wherein the pliable flap comprises rubber.

39. The system of claim 37, wherein the pliable flap includes:
    a rigid cover portion extending at least partially across the cable passage; and
    a flexible portion that operates as a hinge between the rigid cover portion and the display.

* * * * *

UNITED STATES PATENT AND TRADEMARK OFFICE
CERTIFICATE OF CORRECTION

| | | |
|---|---|---|
| PATENT NO. | : 7,459,634 B2 | Page 1 of 1 |
| APPLICATION NO. | : 11/252471 | |
| DATED | : December 2, 2008 | |
| INVENTOR(S) | : Randall W. Martin et al. | |

It is certified that error appears in the above-identified patent and that said Letters Patent is hereby corrected as shown below:

In column 8, line 12, in Claim 31, delete "claim 21" and insert -- claim 30 --, therefor.

Signed and Sealed this

Twenty-second Day of June, 2010

David J. Kappos
*Director of the United States Patent and Trademark Office*